(12) United States Patent
Seyfried et al.

(10) Patent No.: US 7,817,271 B2
(45) Date of Patent: Oct. 19, 2010

(54) CONFOCAL MICROSCOPE AND METHOD FOR DETECTING BY MEANS OF A CONFOCAL MICROSCOPE

(75) Inventors: Volker Seyfried, Nussloch (DE); Frank Schreiber, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 95 days.

(21) Appl. No.: 12/044,951

(22) Filed: Mar. 8, 2008

(65) Prior Publication Data

US 2008/0151243 A1    Jun. 26, 2008

Related U.S. Application Data

(63) Continuation of application No. PCT/EP2006/065667, filed on Aug. 25, 2006.

(30) Foreign Application Priority Data

Sep. 9, 2005    (DE)    ........................ 10 2005 042 890

(51) Int. Cl.
*G01J 3/28*    (2006.01)
(52) U.S. Cl. ...................... 356/326; 356/317
(58) Field of Classification Search .................. 356/325, 356/317
See application file for complete search history.

(56) References Cited

U.S. PATENT DOCUMENTS

| | | | |
|---|---|---|---|
| 4,827,125 A | 5/1989 | Goldstein | |
| 5,192,980 A | 3/1993 | Dixon et al. | |
| 6,038,023 A | 3/2000 | Carlson et al. | |
| 6,255,646 B1 | 7/2001 | Shimada | |
| 6,433,814 B1 | 8/2002 | Engelhardt et al. | |
| 6,614,526 B1 * | 9/2003 | Engelhardt | 356/326 |
| 7,428,043 B2 * | 9/2008 | Boehm et al. | 356/218 |
| 7,477,380 B2 * | 1/2009 | Knebel et al. | 356/326 |
| 2006/0152787 A1 | 7/2006 | Knebel et al. | |

FOREIGN PATENT DOCUMENTS

DE    10102033 A1    8/2002

OTHER PUBLICATIONS

International Search Report from International Application No. PCT/EP2006/065667, filed Aug. 25, 2006, mailed on Oct. 30, 2006.
English translation of International Preliminary Report on Patentability from International Application No. PCT/EP2006/065667, filed Aug. 25, 2006, mailed on Apr. 17, 2008.

* cited by examiner

*Primary Examiner*—L. G Lauchman
(74) *Attorney, Agent, or Firm*—Houston Eliseeva LLP

(57) ABSTRACT

The invention relates to a confocal microscope which illuminates a sample (15) by means of at least one light source. A detection light beam (17) is emitted from the sample (15). The detection light beam (17) is spectrally split up in a spatial manner by the dispersive element (20) and subsequently formed on a photosensor chip (19) by means of a detection optical system (22). At least one expanding optical system (23) is arranged in front of the dispersive element (20) in the direction of the detection light beam (17). The expanding optical system (23) is embodied in such a manner that the numerical aperture of the detection optical system (22) is independent from the numerical aperture of the detection light beam (17) on the detection apertured diaphragm (18).

20 Claims, 4 Drawing Sheets

CONFOCAL MICROSCOPE AND METHOD FOR DETECTING BY MEANS OF A CONFOCAL MICROSCOPE

RELATED APPLICATIONS

This application is a Continuation of PCT application serial number PCT/EP2006/065667 filed on Aug. 25, 2006, which in turn claims priority to German Patent Application No. DE 10 2005 042 890.8 filed on Sep. 9, 2005, both of which are incorporated herein by reference in their entirety.

FIELD OF THE INVENTION

The invention relates to a confocal microscope. In particular, the invention relates to a confocal microscope having at least one light source that emits an illumination light beam that illuminates a sample in pointwise and/or linewise fashion through the optics via a scanning device. Also provided is a detection pinhole diaphragm that is provided in a light beam emanating from the sample. The confocal microscope also comprises a dispersive element that splits the detection light beam emanating from the sample spectrally in space in order to produce a spectrally split detection light beam for a detector optics that images the latter onto a photosensor chip, the detection pinhole diaphragm being arranged in the direction of the detection light beam upstream of the dispersive element.

Furthermore, the invention relates to a method for detecting by means of a confocal microscope.

BACKGROUND OF THE INVENTION

U.S. Pat. No. 6,038,023 discloses a system for fluorescence detection or fluorescence spectroscopy. The light coming from a sample is spectrally split in this case by means of a prism and directed onto a detector array.

German laid-open patent application DE 101 02 033 likewise discloses a scanning microscope for simultaneously detecting a number of spectral regions of a light beam. An element for spectral spreading is provided in the beam path of the light beam. A multichannel photomultiplier or a detector array is placed downstream of the element. In addition, there are focusing means that can be set for imaging the spread light beam onto the multichannel photomultiplier. The focusing means are arranged immediately upstream of the detector array.

SUMMARY OF THE INVENTION

The invention is based on the object of creating a confocal microscope with the aid of which optimum detection results are attained when use is made of a photosensor chip as detector element.

The object is achieved by a confocal microscope that comprises the features described below.

The invention is additionally based on the object of creating a method with which the detection with the aid of a confocal microscope is improved.

The objective object is achieved by a method that has the features described below.

The confocal microscope is advantageous when it has at least one light source that emits an illumination light beam. The illumination light beam illuminates a sample in pointwise and/or linewise fashion through the optics via a scanning device. A detection pinhole diaphragm is provided that is arranged upstream of a dispersive element. The detection light beam emanating from the sample is spatially split by the dispersive element. Provided upstream of a photosensor chip is a detector optics that images the spectrally split detection light beam onto the photosensor chip. In addition, there is provided in the detection light beam an expansion optics that is likewise arranged upstream of the dispersive element. The expansion optics is in this case designed in such a way that the numerical aperture of the detector optics is independent of the numerical aperture of the detection light beam at the detection pinhole diaphragm. There are two advantageous arrangements of the expansion optics. In the case of the first arrangement, the expansion optics is arranged downstream of the detection pinhole diaphragm in the direction of the detection light beam. In the case of a second configuration, the expansion optics is arranged upstream of the detection pinhole diaphragm in the direction of the detection beam.

There are likewise a number of configurations for the expansion optics. Thus, for example, the expansion optics can be configured as zoom optics. It is likewise conceivable for the expansion optics to consist of a number of different expansion optics that are arranged on a revolver-like structure such that different expansion optics can be swung into the beam path of the detection light beam depending on imaging conditions. It is likewise possible to vary the zoom optics or to swing the different expansion optics into the detection light beam by motor.

The method for detecting by means of a confocal microscope is advantageously provided with the steps that a sample is illuminated in pointwise and/or linewise fashion through the optics with the aid of at least one light source and by means of a scanning device; that a detection light beam emanating from the sample is directed onto a dispersive element via a detection pinhole diaphragm, the detection light beam emanating from the sample being spectrally split in space; that the spectrally split detection light beam is imaged onto a photosensor chip by a detector optics; and that an expansion optics is provided upstream of the dispersive element in the detection light beam via which the numerical aperture of the detector optics can be set independently of the numerical aperture of the detection light beam at the detection pinhole diaphragm.

Further advantageous refinements of the invention can be gathered from the subclaims.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
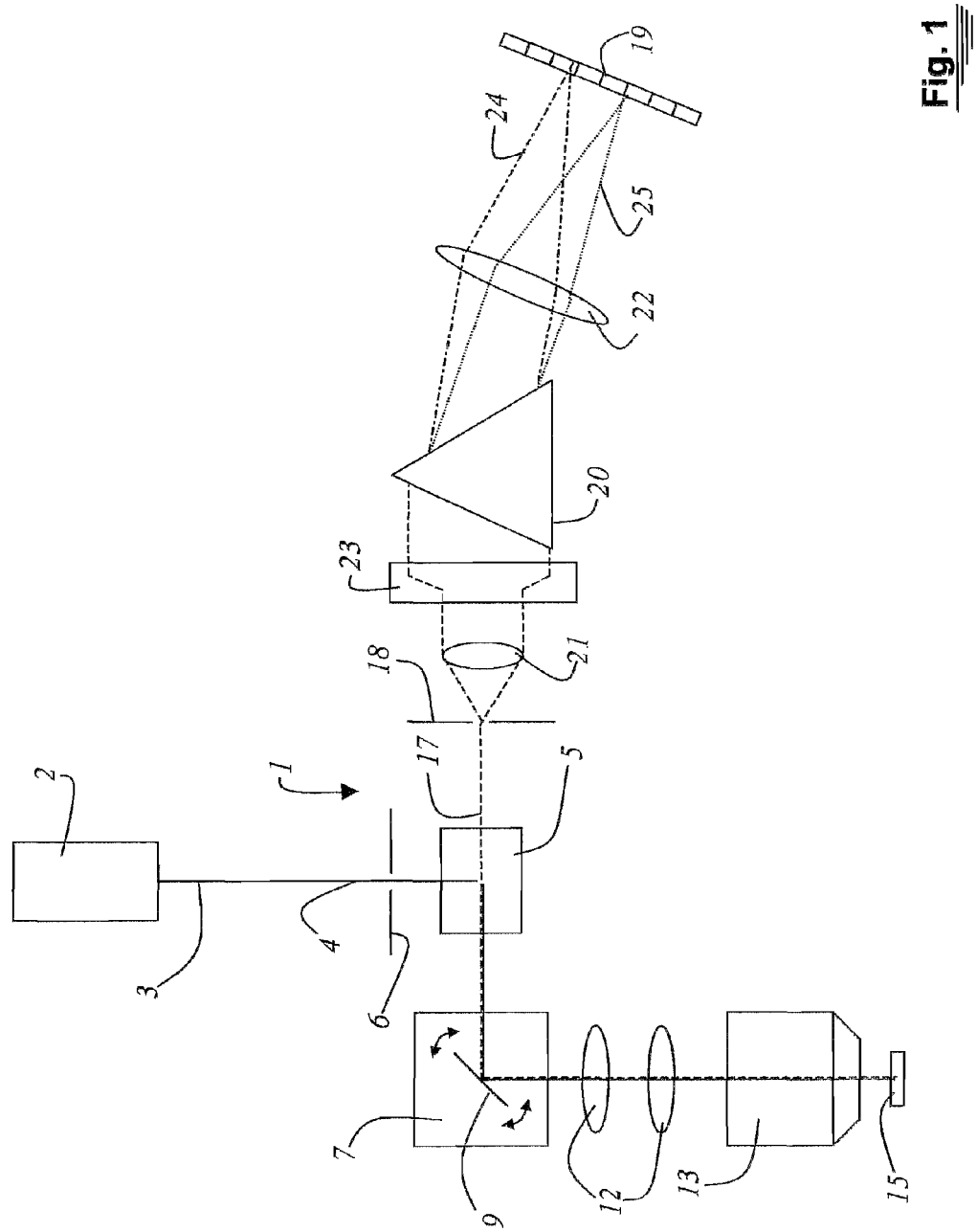
FIG. 1 shows a schematic of a scanning microscope with a photosensor chip for picking up the signals from the detection light.

FIG. 1 shows the schematic design of a confocal scanning microscope 1 in the case of which a photosensor chip 19 is used for detecting the signals of the scanning microscope 1. The illumination light beam 3 coming from at least one illumination system 2 is guided by a beam splitter or a suitable deflecting means 5 to a scanning device 7. Before striking the deflecting means 5, the illumination light beam 3 passes an illumination pinhole 6. The scanning device 7 comprises a cardanically suspended scanning mirror 9 that guides the illumination light beam 3 through a scanning optics 12 and a microscope optics 13 over or through an object 15. The illumination light beam 3 is guided over the object surface in the case of nontransparent objects 15. In the case of biological objects 15 (preparations) or transparent objects, the illumination light beam 3 can also be guided through the object. For these purposes, nonluminous preparations are prepared, if appropriate, with a suitable dye (not illustrated, since established prior art). The dyes present in the object 15 are excited by the illumination light beam 3 and emit light in the characteristic region of the spectrum specific to them. This light emanating from the object 15 defines a detection light beam 17. The latter passes through the microscope optics 13, the scanning optics 12 and via the scanning module 7 to the deflecting means 5, passes the latter and, via a detection pinhole diaphragm 18, reaches at least one photosensor chip 19 that is designed as a CCD chip, EMCCD chip or APD array. The detection light beam 17 emanating from the object 15 or defined is illustrated in FIG. 1 as a dashed line. Electrical detection signals dependant on the power of the light emanating from the object 15 are generated in the photosensor chip 19. Since, as already mentioned above, the object 15 emits light not only of one wavelength, it is sensible to provide a dispersive element 20 upstream of the photosensor chip 19. The dispersive element 20 splits the detection light beam spectrally such that the individual wavelengths of the detection light are spectrally separated in space. Placed upstream of the dispersive element 20 is at least one lens 21 that expands the detection light beam 17 and renders it parallel. Placed downstream of the dispersive element 20 is a detector optics 22 that focuses spectrally separated beams 24, 25 of the detection light beam 17 onto the photosensor chip 19. The spectrally separated beams differ from one another with regard to the wavelength and therefore strike different regions on the photosensor chip 19. An expansion optics 23 is provided upstream of the dispersive element 20 in the embodiment illustrated here. The expansion optics is designed in such a way that the numerical aperture of the detector optics 22 is independent of the numerical aperture of the detection light beam 17 at the detection pinhole diaphragm 18.

Figure 2:
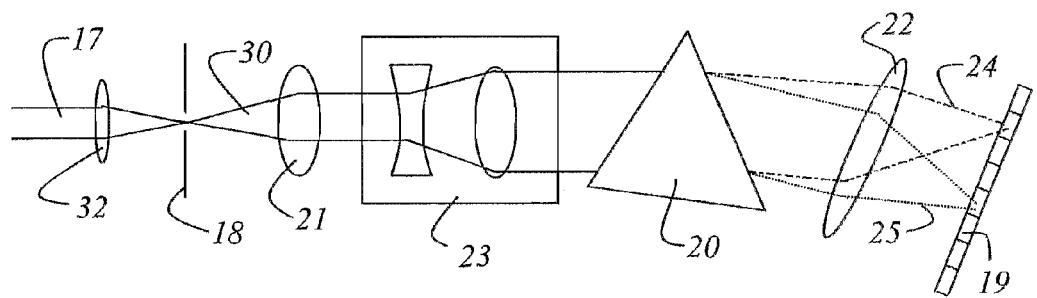
FIG. 2 shows a schematic detailed view of a first embodiment of the arrangement of the expansion optics in the detection light beam.

FIG. 2 shows a schematic detailed view of a first embodiment of the arrangement of the expansion optics 23 in the detection light beam 17. The expansion optics 23 is necessary in order not to lose any detection light. Here, the cross section of the optics downstream of the detection pinhole diaphragm 18 is designed such that no overillumination occurs even in the case of a maximum aperture angle of the light cone 30 downstream of the detection pinhole diaphragm, that is to say the lenses downstream of the expansion optics 23 are precisely completely illuminated. In the case of a fixed optics, this would mean that the lenses are not completely illuminated for light cones with a small aperture angle, and thus that the full numerical aperture of the system is not visualized. An incompletely illuminated optics in the detection light beam leads in the final analysis to a polorer resolution or to a reduction in the detection efficiency, caused by a greater focus at the detector. This reduced resolution is a substantial disadvantage in the case of relatively small detectors, in particular in the case of detector arrays such as are used, for example, in combination with a spectral splitting of the light. In the case of the embodiment illustrated in FIG. 2, the expansion optics 23 is arranged downstream of the detection pinhole diaphragm 18. The detection light beam 17 is imaged onto the detection pinhole diaphragm 18 through an optics 32 of fixed focal length. The diverging light cone 30 emanating from the detection pinhole diaphragm 18 is parallelized with the aid of a further optics 21. Subsequently, the detection light strikes the expansion optics 23. As a result of the variable expansion optics 23, the focal size at the detector is independent of the aperture of the light cone downstream of the detection pinhole diaphragm 18.

The size of the detection pinhole diaphragm 18 is measured in micrometers. The resolution in the confocal microscope is a function of the size of the detection pinhole diaphragm 18 relative to the numerical aperture of the detection light beam 17 focused onto the detection pinhole diaphragm 18. The resolution is measured in Airy units, using the following equation $d_{Airy}=1.22 \times \lambda/NA$. One and the same Airy unit can thus correspond to a large detection pinhole diaphragm 18 with a light cone of small aperture angle, or to a small detection pinhole diaphragm 18 and a light cone of large aperture angle. The detection light 17 exiting the expansion optics 23 strikes the dispersive element 20 such that the detection light is spectrally split in space. The spectrally split detection light is imaged onto the photosensor chip 19 with the aid of a detector optics 22. The aim is to obtain, in conjunction with a given maximum Airy size of the detection pinhole diaphragm 18, a spot that is as small as possible at the photosensor chip 19, such that the latter is optimally illuminated and a maximum signal-to-noise ratio is achieved. The spot size at the photosensor chip 19 is yielded from the size of the detection pinhole diaphragm 18 and the linear magnification of the optics lying therebetween. Thus, a large aperture of the detection pinhole diaphragm 18 places relatively stringent requirements on the linear magnification of the optics. However, this goes together with a small aperture angle downstream of the detection pinhole diaphragm for a given resolution of the confocal microscope. Thus, precisely in this case the complete numerical aperture of the optics is not utilized given a fixed detection optics. The inventively variable expansion optics 23 ensures that the maximum numerical aperture of the detector optics 22 is always utilized independently of the aperture angle of the light cone downstream of the detection pinhole diaphragm 18. Consequently, an improved scale ratio can be achieved in conjunction with otherwise identical optics precisely in the case of large detection pinhole diaphragms 18. In the direction perpendicular to the spectrum, the quantum efficiency and thus the signal-to-noise ratio of the detector and, in the direction of the spectrum, the spectral resolution thereof, are increased owing to the optimized illumination, such as of a detector line, for example. Thus, in the case of the use of an expansion optics in conjunction with the same maximum spot size (size of the photosensor chip 19), the detector optics 22 can be implemented with focal lenses of greater focal length. A large focal length of the focal lens is particularly important for detectors that are hermetically sealed and therefore require a cover glass. In the case of these detectors, it is necessary to focus through the cover glass onto the photosensitive layer of the photosensor chip 19.

Figure 3:
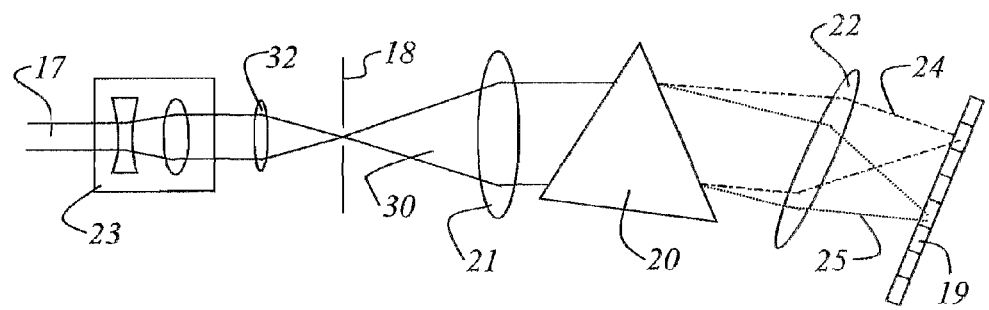
FIG. 3 shows a schematic detailed view of a second embodiment of the arrangement of the expansion optics in the detection light beam.

FIG. 3 shows a further embodiment of the invention. Here, the expansion optics is arranged upstream of the detection pinhole diaphragm 18. The detection light emanating from the expansion optics 23 strikes a fixed optics 32 that focuses the detection light onto the detection pinhole diaphragm 18. Arranged downstream of the detection pinhole diaphragm is an optics 21 that parallelizes the light cone 30 emanating from the detection pinhole diaphragm 18 and images it onto the dispersive element 20. Once again, the detector optics 22 images the spatially split detection light 24 and 25 onto the photosensor chip 19. The same advantages as already mentioned in the description relating to FIG. 2 also result in the case of the embodiment illustrated in FIG. 3.

Figure 4:
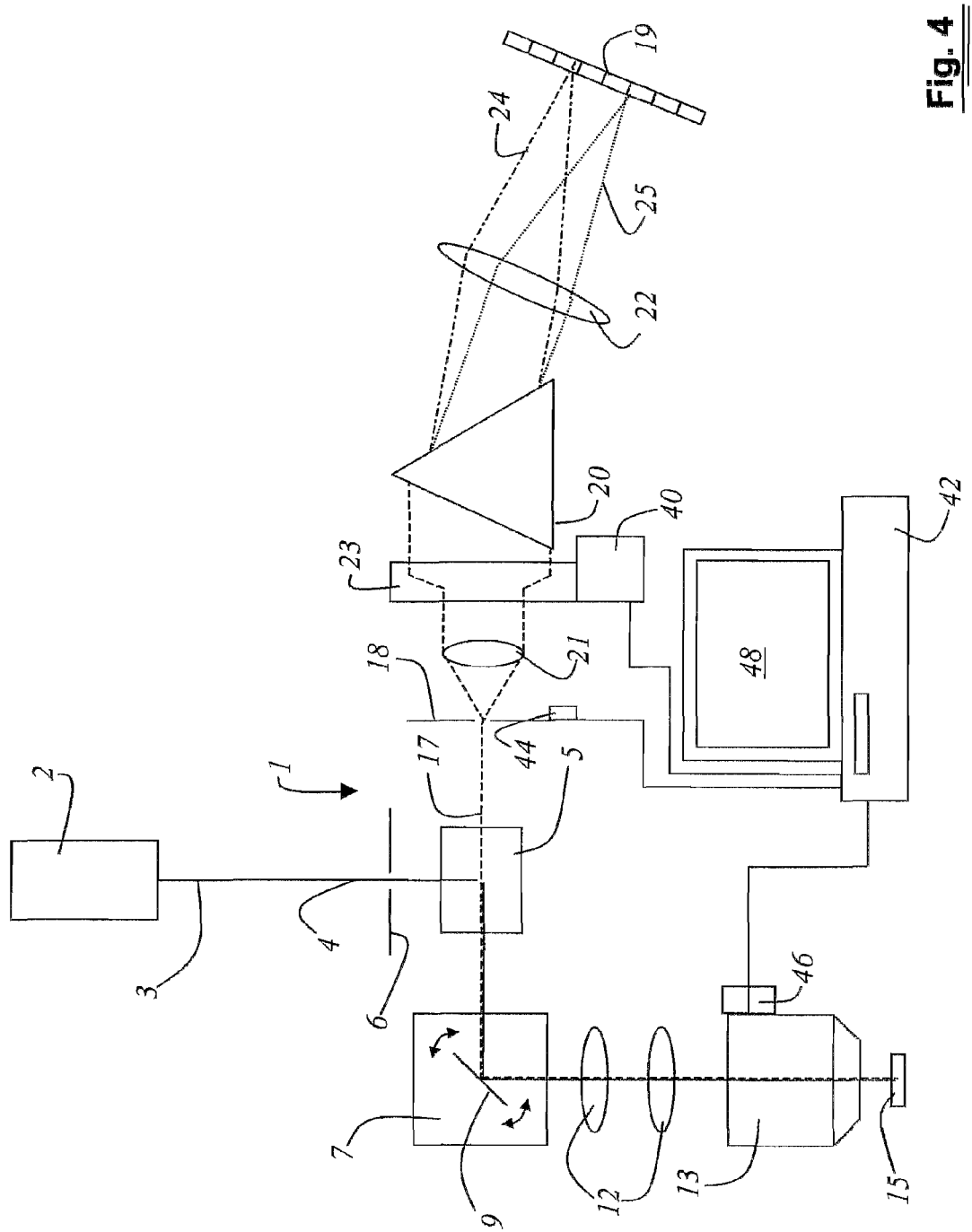
FIG. 4 shows a schematic of the expansion optics as zoom optics in conjunction with actuating elements and a computer for setting the zoom.

FIG. 4 shows a schematic of the expansion optics 23 in the form of a zoom optics that is connected to at least one actuating element 40. A confocal microscope is assigned a control and regulating unit 42 that ensures in conjunction with the confocal microscope that the expansion optics 23 is automatically adapted to an objective 13 of the confocal microscope that is currently in use, and to the set size of the detection pinhole diaphragm 18. In order to adapt the expansion optics 23 automatically, it is possible to provide the detection pinhole diaphragm 18 with an encoder 44 that determines the size of the detection pinhole diaphragm 18 set. It is likewise possible to provide the objective 13 of the microscope with an encoder so that the type of objective currently being used can be determined. The size of the setting of the detection pinhole diaphragm 18 or of the objective 13 is transmitted by the encoders 44 and 46 to the control and regulating unit 42. The control and regulating unit 42 uses the determined sizes to determine a manipulated variable for the expansion optics 23, and transmits this manipulated variable to the actuating element 40 connected to the expansion optics 23. It is likewise possible to connect to the control and regulating unit 42 a display 48 that indicates to a user the objective 13 or the confocal microscope that is currently being used by the control and regulating unit 42, and the size of the detection pinhole diaphragm 18 currently set. The display 48 can likewise indicate to the user the required, manual adaptation of the expansion optics 23.

Figure 5:
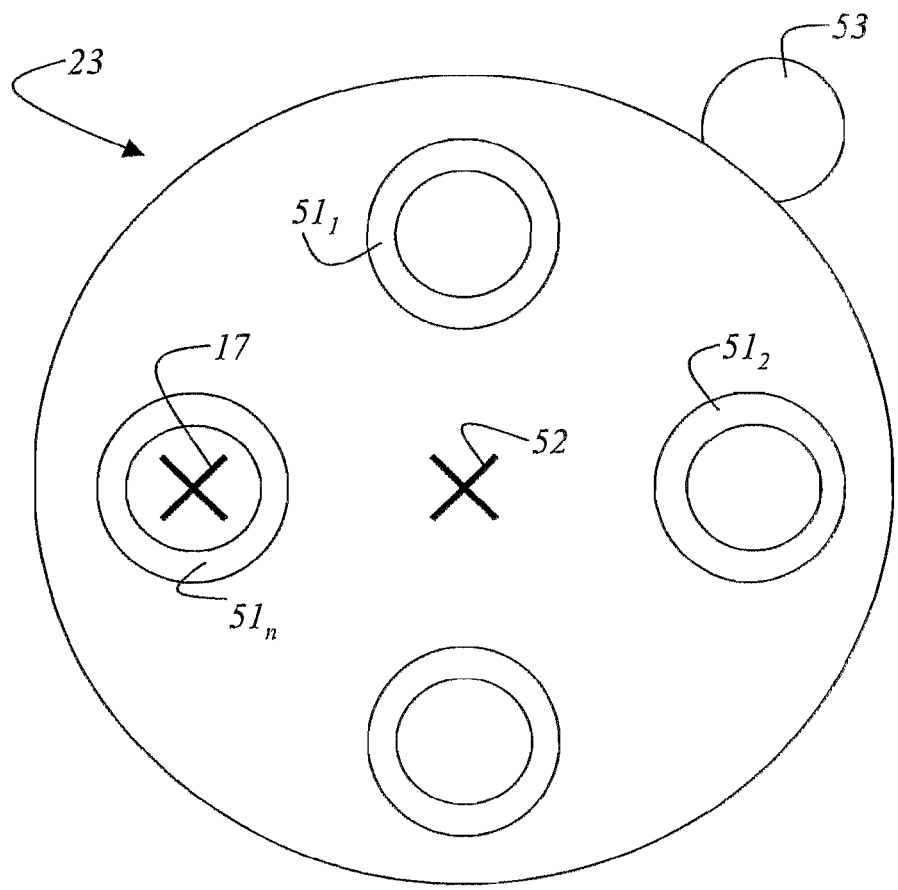
FIG. 5 shows a schematic view of an expansion optics from a number of different expansion optics.

FIG. 5 shows a schematic view of expansion optics 23 that consist of a number of different expansion optics $51_1$, $51_2$, ... $51_n$. Expansion optics 23 are designed in the form of a revolver carrying a number of expansion optics $51_1$, $51_2$, ... $51_n$. The expansion optics 23 is supported in a fashion capable of rotating about an axis 52 such that the different expansion optics $51_1$, $51_2$ ... $51_n$ can be swung into the detection light beam 17. The corresponding rotation of the expansion optics 23 can be performed by a friction element 53, for example.

Figure 6:
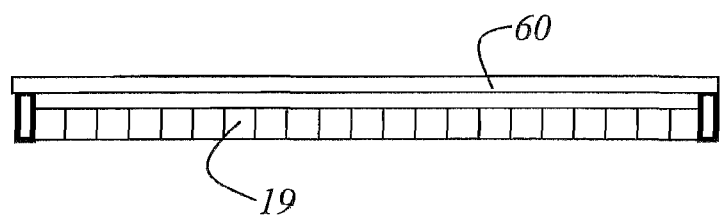
FIG. 6 shows a schematic of an embodiment of a photosensor chip.

FIG. 6 shows an embodiment of the photosensor chip 19. The photosensor chip 19 is hermetically sealed by a glass plate 16. Consequently, the spectrally split detection light 24, 25 must be focused through the glass plate 60 onto the photosensor chip 19 with the aid of the detector optics 22. The photosensor chip 19 can be designed as a CCD array, or as an EMCCD array, or as an APD array.

While this invention has been particularly shown and described with references to preferred embodiments thereof, it will be understood by those skilled in the art that various changes in form and details may be made therein without departing from the scope of the invention encompassed by the appended claims.

What is claimed is:

1. A confocal microscope for observing a sample comprising
   an optics,
   a scanning device,
   a photosensor,
   an illumination light beam,
   a detection light beam emanating from the sample,
   a spectrally split detection light beam,
   at least one light source emitting the illumination light beam illuminating the sample pointwise and/or linewise through the optics via the scanning device,
   a detection pinhole diaphragm in the detection light beam,
   a dispersive element splitting the detection light beam spectrally in space producing the spectrally split detection light beam,
   a detector optics imaging the spectrally split detection light beam onto the photosensor,
   a detection pinhole diaphragm in the detection light beam upstream of the dispersive element, and
   at least one expansion optics upstream of the dispersive element in the detection light beam the expansion optics providing that a numerical aperture of the detector optics is independent of a numerical aperture of the detection light beam at the detection pinhole diaphragm.

2. The confocal microscope as claimed in claim 1, wherein the expansion optics is arranged downstream of the detection pinhole diaphragm in the direction of the detection light beam.

3. The confocal microscope as claimed in claim 1, wherein the expansion optics is arranged upstream of the detection pinhole diaphragm in the direction of the detection light beam.

4. The confocal microscope as claimed in claim 1, wherein the expansion optics is a variable zoom optics.

5. The confocal microscope as claimed in claim 1, wherein the expansion optics comprises a plurality of expansion optics that differ from one another with regard to the degree of expansion and are moveable into the detection light beam.

6. The confocal microscope as claimed in claim 5, wherein each of the plurality of expansion optics is moveable into the detection light beam by a motor.

7. The confocal microscope as claimed in claim 1, further comprising
   an objective,
   a control and regulating unit, and
   an actuating element connected to the expansion optics and to the control and regulating unit,
   wherein the expansion optics is automatically adapted to the objective and to a size of the detection pinhole diaphragm.

8. The confocal microscope as claimed in claim 1, further comprising
   an objective and
   a display identifying the objective and a size of the detection pinhole diaphragm to a user,
   wherein adjustment of the expansion optics is performed manually.

9. The confocal microscope as claimed in claim 1, wherein the photosensor chip is a CCD array, an EMCCD array, or an APD array.

10. The confocal microscope as claimed in claim 1, wherein the photosensor is hermetically sealed by a glass cover.

11. A method for of confocal microscopy, comprising:
illuminating a sample pointwise and/or linewise through an optics using at least one light source and a scanning device;
directing a detection light beam emanating from the sample onto a dispersive element via a detection pinhole diaphragm, resulting in the detection light beam being spectrally split in space;
imaging the spectrally split detection light beam onto a photosensor by a detector optics; and
using an expansion optics upstream of the dispersive element in the detection light beam to set a numerical aperture of the detector optics independently of a numerical aperture of the detection light beam at the detection pinhole diaphragm.

12. The method as claimed in claim 11, wherein the expansion optics is arranged downstream of the detection pinhole diaphragm in the direction of the detection light beam.

13. The method as claimed in claim 11, wherein the expansion optics is arranged upstream of the detection pinhole diaphragm in the direction of the detection light beam.

14. The method as claimed in claims 11, wherein the expansion optics is a zoom optics.

15. The method as claimed in claim 11, wherein the expansion optics comprises a plurality of expansion optics that differ with regard to the degree of expansion and are moveable into the detection beam.

16. The method as claimed in claim 15, wherein each of the plurality of expansion optics is moveable into the detection beam by a motor.

17. The method as claimed in claims 11, wherein the expansion optics is connected with at least one actuating element connected to a control and regulating unit of the confocal microscope so that the expansion optics is automatically adapted to an objective of the confocal microscope and to a size of the detection pinhole diaphragm.

18. The method as claimed in claims 11, wherein a display identifies an objective of the confocal microscope and a size of the detection pinhole diaphragm to a user, wherein adjustment of the expansion optics is performed manually.

19. The method as claimed in claim 11, wherein the photosensor chip is a CCT array, an EMCCD array, or an APD array.

20. The method as claimed in claim 11, wherein the photosensor is hermetically sealed by a glass cover.

* * * * *